United States Patent
Watanabe et al.

(10) Patent No.: US 7,447,615 B2
(45) Date of Patent: Nov. 4, 2008

(54) SIMULATION APPARATUS FOR ROBOT OPERATION HAVING FUNCTION OF VISUALIZING VISUAL FIELD BY IMAGE CAPTURING UNIT

(75) Inventors: Atsushi Watanabe, Tokyo (JP); Yoshiharu Nagatsuka, Yamanashi (JP)

(73) Assignee: FANUC Ltd, Minamitsuru-gun, Yamanashi (JP)

( * ) Notice: Subject to any disclaimer, the term of this patent is extended or adjusted under 35 U.S.C. 154(b) by 422 days.

(21) Appl. No.: 10/972,675

(22) Filed: Oct. 26, 2004

(65) Prior Publication Data
US 2005/0096892 A1  May 5, 2005

(30) Foreign Application Priority Data
Oct. 31, 2003  (JP) .............................. 2003-372518

(51) Int. Cl.
*G06G 7/48* (2006.01)
(52) U.S. Cl. ......................................................... 703/7
(58) Field of Classification Search ....................... None
See application file for complete search history.

(56) References Cited

U.S. PATENT DOCUMENTS

| | | | | |
|---|---|---|---|---|
| 4,754,415 A | * | 6/1988 | George et al. | 700/250 |
| 4,831,549 A | * | 5/1989 | Red et al. | 700/254 |
| 5,729,471 A | * | 3/1998 | Jain et al. | 725/131 |
| 6,122,003 A | * | 9/2000 | Anderson | 348/207.99 |
| 6,249,285 B1 | * | 6/2001 | Madden et al. | 345/419 |
| 2002/0120921 A1 | * | 8/2002 | Coburn et al. | 717/140 |

* cited by examiner

*Primary Examiner*—Ngoc-Yen Vu
*Assistant Examiner*—Paul Berardesca
(74) *Attorney, Agent, or Firm*—Drinker Biddle & Reath LLP

(57) ABSTRACT

A work cell is defined on the simulation apparatus and a robot mounting an image capturing device, a workpiece, etc. are arranged in it; a separately set visual volume model is introduced into it, a tool coordinate system (tool tip point) is defined at a view point, and a detection reference point (detection reference coordinate system) is set relating to the workpiece; a graphic jog is performed to make the robot move so that the tool coordinate system matches with the detection reference coordinate system; and a simulated correction amount by the visual sensor is designated and the display of the visual volume model is switched on and off in accordance with output/nonoutput of the image capturing command at the time of simulation of the operation program.

10 Claims, 12 Drawing Sheets

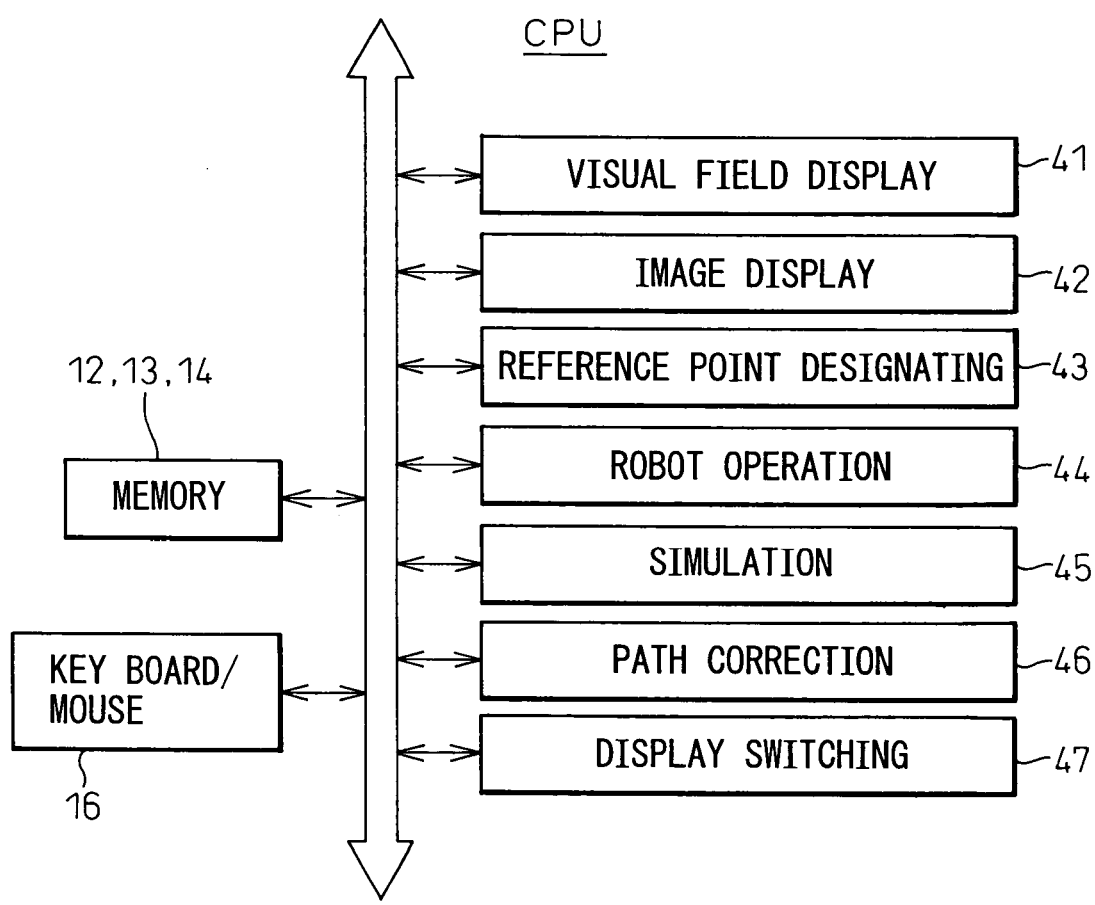

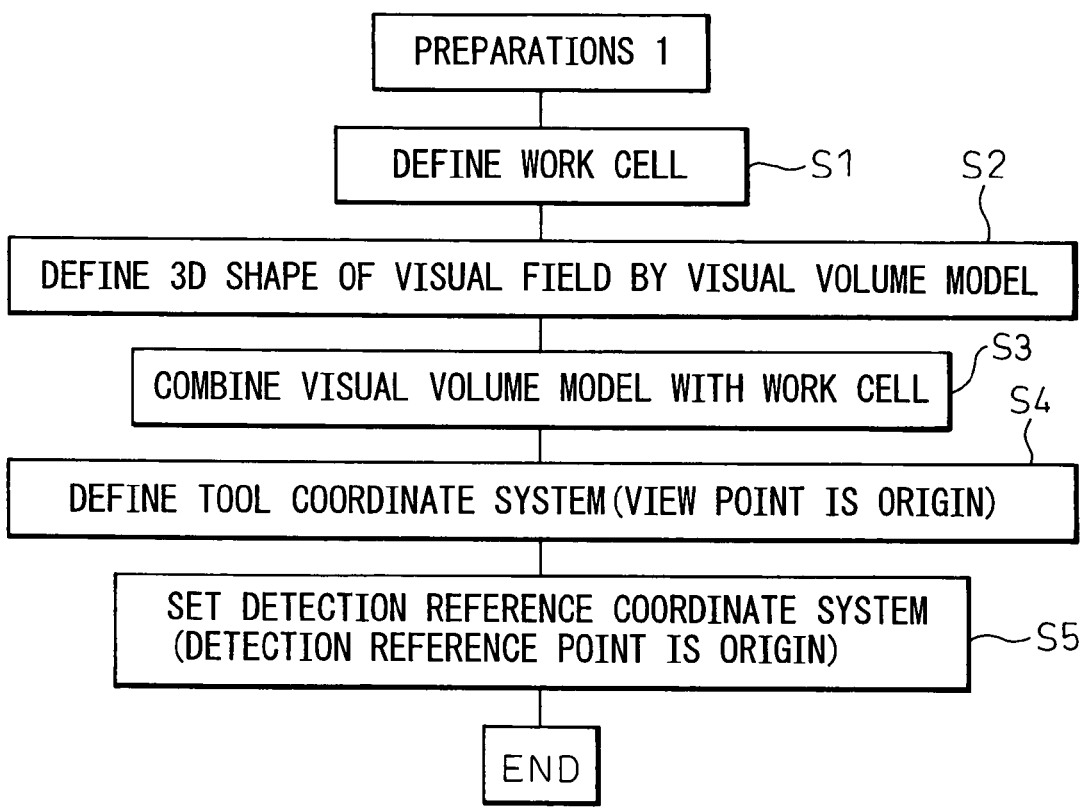

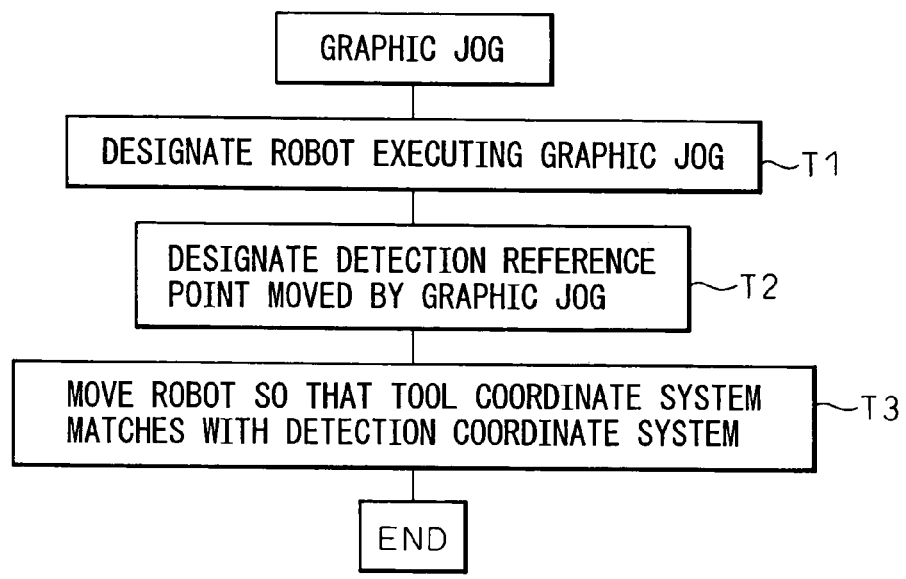
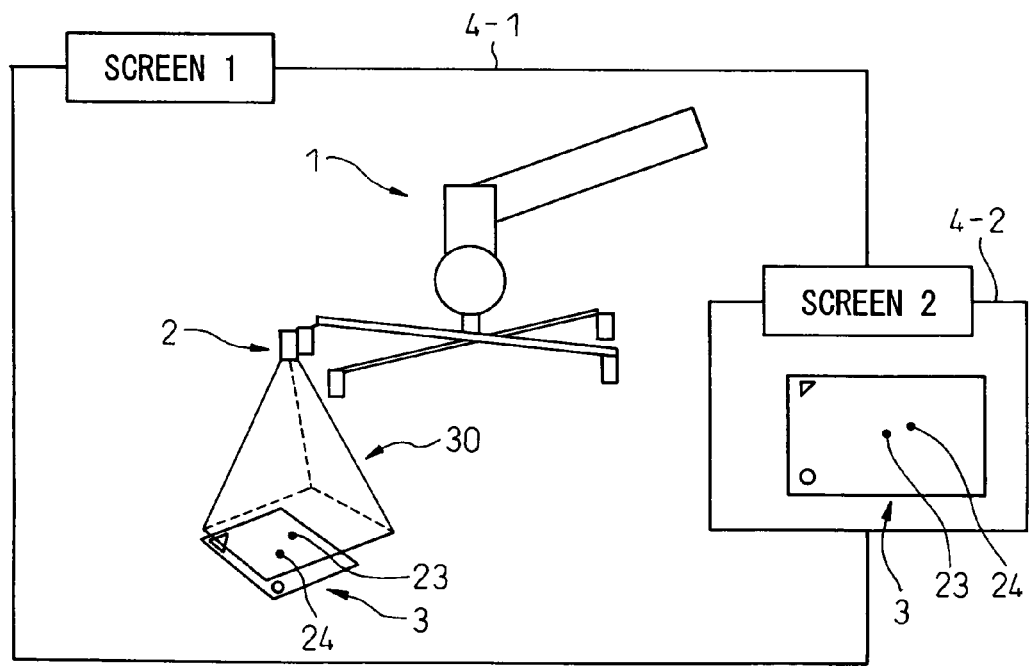

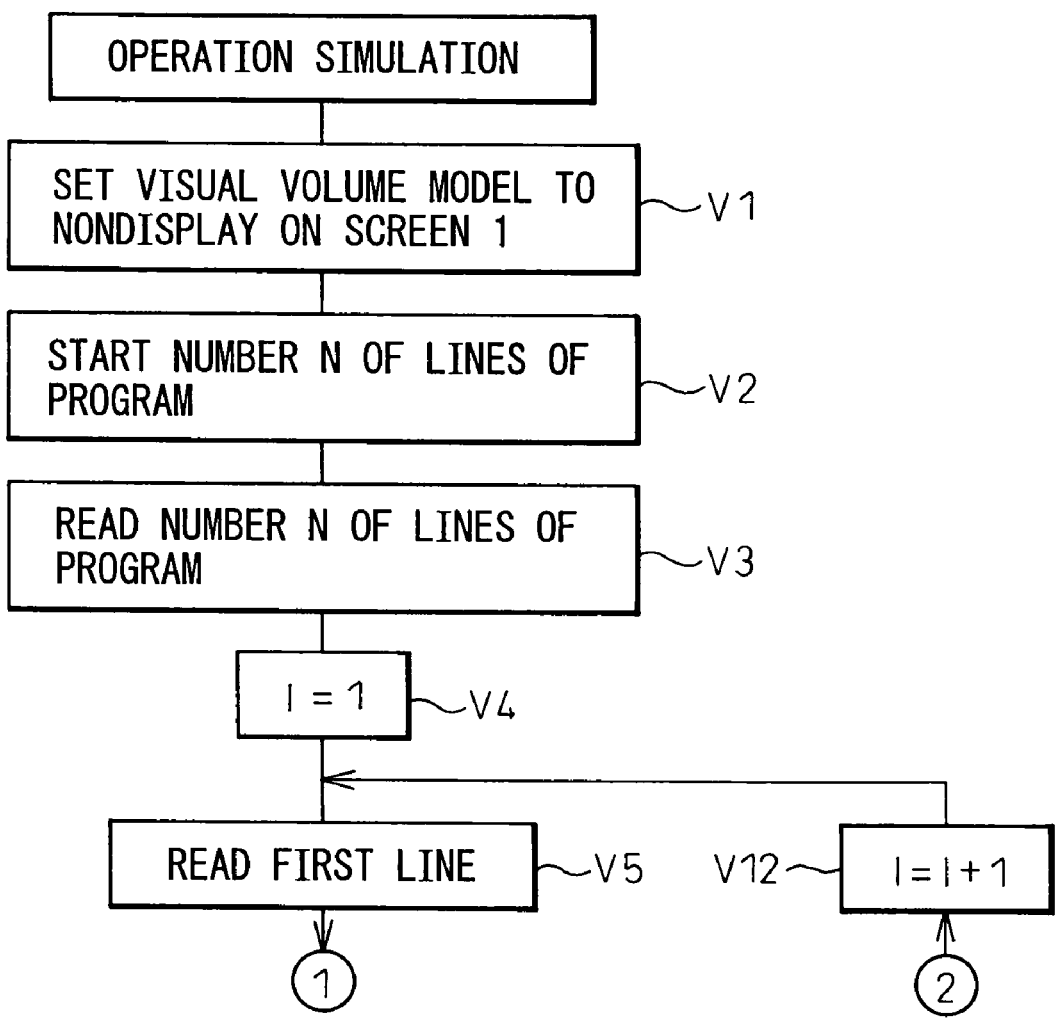

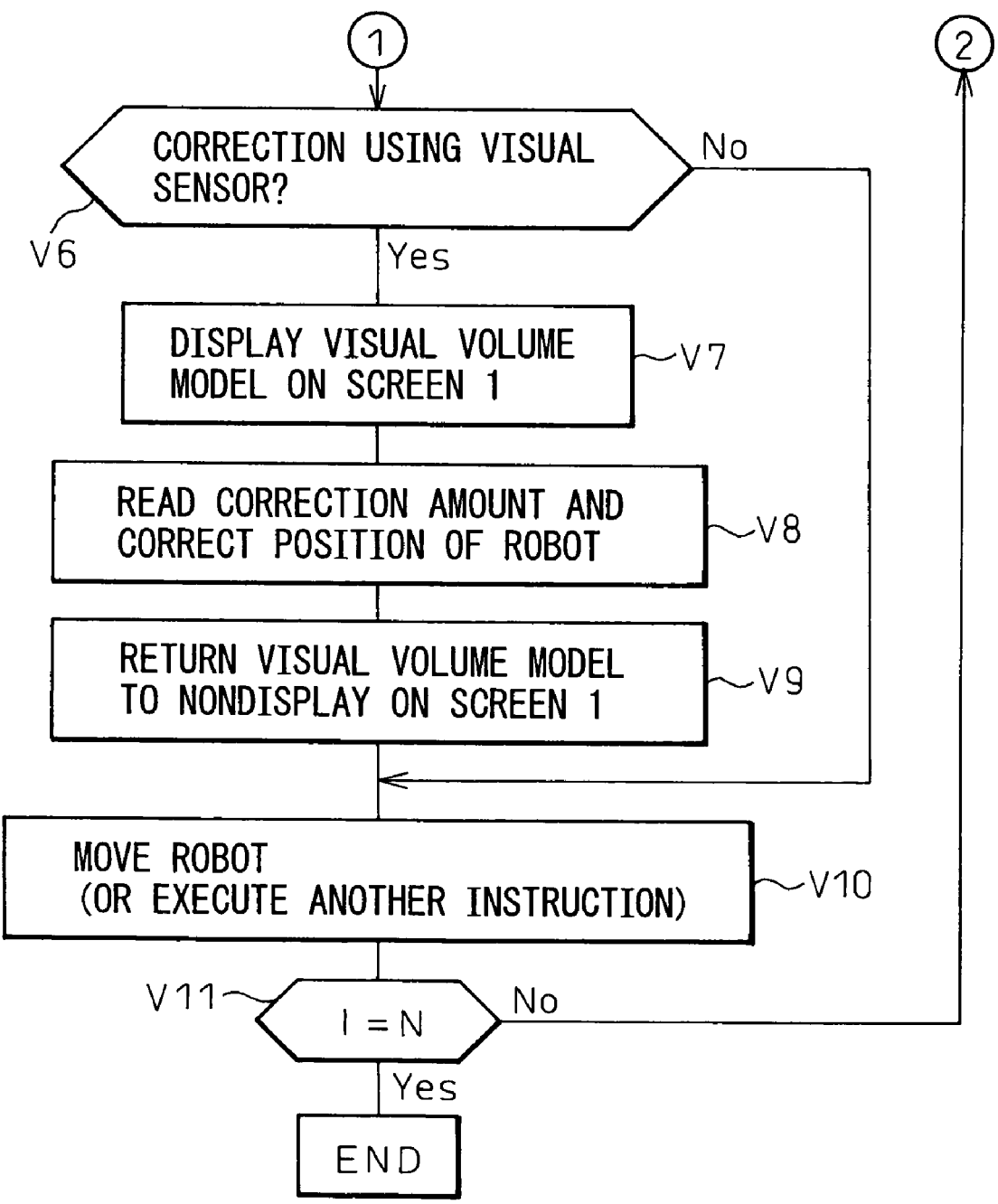

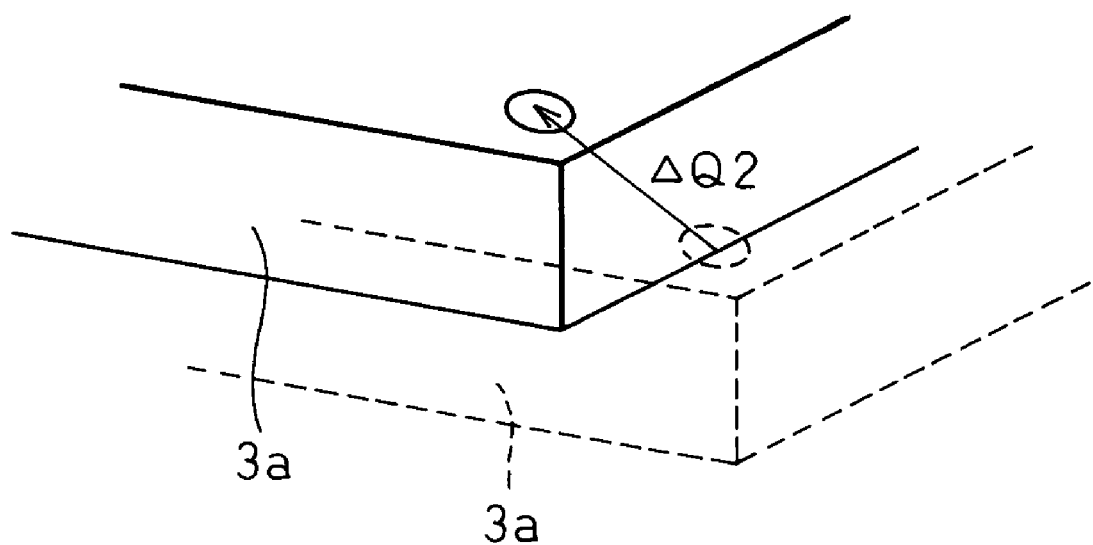

SIMULATION APPARATUS FOR ROBOT OPERATION HAVING FUNCTION OF VISUALIZING VISUAL FIELD BY IMAGE CAPTURING UNIT

BACKGROUND OF THE INVENTION

1. Field of the Invention

The present invention relates to a simulation apparatus for a robot system including a visual sensor having an image capturing means and a robot, more particularly relates to a simulation apparatus useful when preparing an operation program including robot movement and detection by the visual sensor off line and evaluating, correcting, editing, etc. the program finished being prepared or in the process of preparation off line.

2. Description of the Related Art

Known in the art is a simulation apparatus arranging and displaying on a screen three-dimensional models of a robot, workpiece, and peripheral equipment and simulating robot operation in accordance with designated robot movement commands etc. The simulation apparatus is used when preparing an operation program for the robot off line or evaluating, correcting, editing, etc. the program prepared off line. With a conventional simulation apparatus, however, when trying to prepare, correct, edit, etc. a program off line at a location where the actual machinery is not deployed (for example, an office), simulation relating to the visual sensor has been almost impossible.

For example, it has not been possible to obtain a grasp of the three-dimensional shape (visual volume) of the visual field of the image capturing means (for example, digital CCD camera, same below) which the visual sensor uses for image capturing. Further, it has not been known what kind of image the image capturing means can capture. This was inconvenient. In particular, when mounting an image capturing means in a robot, not knowing what kind of image would be obtained along with the position and orientation of the robot was a big problem. Therefore, for matters relating to the visual sensor, the practice has been to actually mount an image capturing means on a robot on-site, operate the visual sensor to obtain an image while changing the position and orientation of the robot, and check the resultant image.

Further, when determining the position and orientation of the robot for the image capturing means actually mounted on the robot to view a reference point relating to detection of an object (workpiece etc.) (normally set to a suitable position on the object desired to be viewed by the image capturing means) as well, the practice has been to operate the robot on-site and perform the work by trial and error while viewing the captured image. Further, determining where in the operation program of the robot to insert the visual sensor detection command also required trial and error.

In this way, when using a simulation apparatus to prepare an operation program off line or evaluate, correct, edit, etc. the program prepared off line for a robot system including a visual sensor, various inconveniences arose and led to a drop in the work efficiency. No disclosure of technology for dealing with such inconveniences or the drop in work efficiency has been found in the known art.

SUMMARY OF THE INVENTION

The present invention provides a simulation apparatus able to reduce or eliminate the various inconveniences and drop in work efficiency which had arisen when preparing an operation program off line or evaluating, correcting, editing, etc. the program prepared off line for a robot system including a visual sensor.

To attain the above, the present invention provides a simulation apparatus arranging and simultaneously displaying on a screen three-dimensional models of at least a robot, workpiece, and image capturing means of a visual sensor and simulating operation of the robot, wherein provision is made of a visual field display means for displaying the visual field of the image capturing means on the screen by a three-dimensional shape. Due to this, the three-dimensional shape (visual volume) of the visual field of the image capturing means can be easily confirmed on the screen. Here, the three-dimensional shape of the visual field is typically a square pyramid.

BRIEF DESCRIPTION OF THE DRAWINGS

These and other objects and features of the present invention will become clearer from the following description of the preferred embodiments given with reference to the attached drawings, wherein:

FIG. 1B is a view listing up the various means characteristic to the present invention formed by mainly the CPU 11 in the apparatus of FIG. 1A;

FIG. 2 is a flow chart describing the flow of the "Preparations 1" performed in an embodiment of the present invention;

FIGS. 5A to 5C are views for explaining how to set a tool tip point and a detection reference point as performed after introducing the visual volume of the image capturing means into the work cell, wherein FIG. 5A shows the displayed image of a display and FIG. 5B and FIG. 5C show a detection reference coordinate system and tool coordinate system;

FIG. 6 is a flow chart describing the flow of a "graphic jog" performed in an embodiment of the present invention;

FIG. 7 is a view of the displayed image of the display a little before completion of the graphic jog;

FIGS. 10A and 10B are flow charts describing the flow of processing for simulation of an operation program performed in an embodiment of the present invention;

FIG. 13 is a view explaining change of a position and orientation of a workpiece corresponding to the setting of a correction amount.

DETAILED DESCRIPTION

Figure 1A:
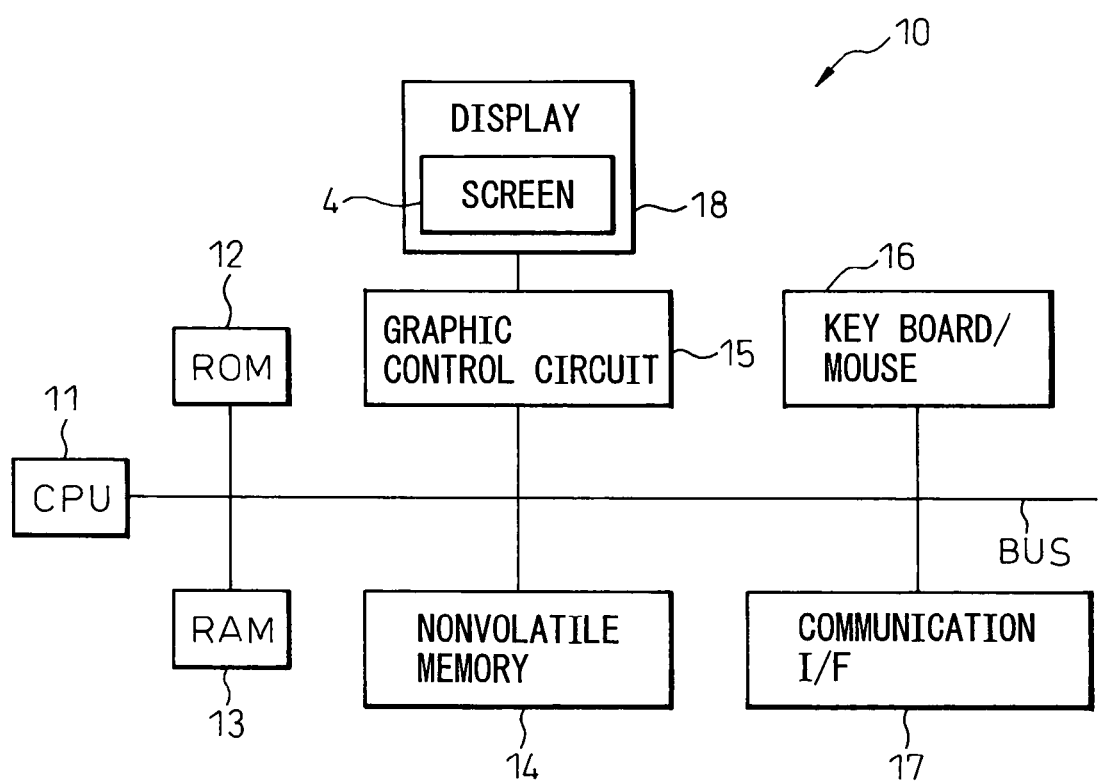
FIG. 1A is a block diagram of the general configuration of a simulation apparatus according to an embodiment of the present invention.

The present invention will be described in detail below while referring to the attached figures.

The present invention, referring to FIG. 1B, provides a simulation apparatus arranging and simultaneously displaying on a screen three-dimensional models of at least a robot, workpiece, and image capturing means of a visual sensor and simulating operation of the robot, wherein provision is made of a visual field display means 41 for displaying the visual field of the image capturing means (2) on the screen by a three-dimensional shape. Due to this, the three-dimensional shape (visual volume) of the visual field of the image capturing means (2) can be easily confirmed on the screen. Here, the three-dimensional shape of the visual field is typically a square pyramid (31).

Further, the present invention may also provide an image display means 42 for displaying an image captured by the image capturing means (2) in the visual field on a screen. Due to this, what kind of image is obtained can be understood without on-site confirmation work. In both cases, the image capturing means (2) is typically mounted on the robot, but the present invention may also be applied to a case of providing the image capturing means (2) away from the robot of course. In the case of mounting it on the robot, the screen of the simulation apparatus displays model images of the robot and the image capturing means mounted thereon, while in the case of provision away from the robot, the screen of the simulation apparatus displays model images of the robot and the image capturing means provided away from it. The present invention further proposes to provide a reference point designating means 43 for designating a first reference point relating to the workpiece and a robot operating means 44 for making the robot on the screen operate so that a predetermined second reference point relating to the visual field matches with the first reference point. According to this proposal, it is possible to use the simulation apparatus displaying the three-dimensional shape of the visual field of the image capturing means (2) of the visual sensor on a screen to easily define a reference point (first reference point) relating to detection of an object and study the position and orientation of the robot for viewing the first reference point.

Further, the present invention proposes to provide the simulation apparatus with a simulating means 45 for performing a simulation including robot movement in accordance with a robot operation program including image capturing commands for making the image capturing means (2) capture an image, movement commands for making the robot move along a path, and correction commands relating to the image capturing commands and movement commands, means (12, 13, 14) for storing correction amounts relating to the path of movement designated by the movement commands, and path correcting means 46 for reading out the stored correction amounts and correcting the path of movement on the screen by the correction commands during the simulation. Due to this proposal, it is possible to give suitable correction amounts envisioned for an operation program including instruction content for correcting the path of movement of the robot by using the results of detection by the visual sensor so as to make the robot move on the screen and assist evaluation and correction of the operation program. Here, in the case of correcting the path of movement of the robot on the screen as explained above, it is possible to correct the position of arrangement of at least one of the workpiece and peripheral equipment on the screen according to the above correction amount.

Note that it is also possible to provide a display switching means 47 for switching the display mode of the display of the visual field in accordance with the image capturing command. The switching of the display mode may also be switching of display/nondisplay in accordance with the image capturing command. By doing this, at the time of simulation, the operator can visually confirm the three-dimensional shape of the visual field of the image capturing means (2) and the timing of issuance of the image capturing command (where in operation program). This is extremely convenient.

According to the present invention, it is possible to reduce or eliminate the various inconveniences and drop in work efficiency which had arisen when preparing an operation program off line or evaluating, correcting, editing, etc. the program prepared off line for a robot system including a visual sensor. Specifically, the following advantages arise.

(1) The basic functions of a simulation apparatus are augmented by an image display function for the three-dimensional shape (visual volume) of the visual field of the image capturing means (2). The basic conditions for studying matters relating to the visual sensor are therefore met.

(2) Use of the simulation apparatus displaying the three-dimensional shape of the visual field of the image capturing means (2) of the visual sensor on a screen enables easy definition of the reference point (first reference point) relating to detection of an object and study of the position and orientation of the robot for viewing the first reference point.

(3) It is possible to give suitable correction amounts envisioned for an operation program including instruction content for correcting the path of movement of the robot by using the results of detection by the visual sensor (correction amounts envisioned as for the correction of the path based on the results of detection of the visual sensor) so as to make the robot move on the screen and assist evaluation and correction of the operation program.

(4) Switching the display mode relating to the display of the visual field in accordance with an image capturing command enables an operator to visually confirm the three-dimensional shape of the visual field of the image capturing means (2) and the timing (where in operation program) of issuance of the image capturing command at the time of simulation. This is extremely convenient.

Below, an embodiment of the present invention will be explained with reference to the drawings. First, FIG. 1A is a block diagram of the general configuration of a simulation apparatus according to this embodiment. As shown in the figure, the simulation apparatus 10 is comprised of a CPU 11, memories (ROM 12, RAM 13, nonvolatile memory 14), a graphic control circuit 15, a keyboard/mouse (manual input device) 16, and a communication interface (I/F) 17 all connected to a bus line BUS of the CPU 11, and a display (for example, liquid crystal display, CRT, etc.) 18 connected to the graphic control circuit 15. Reference numeral 4 indicates a screen of the display 18. Further, while not illustrated, in accordance with need, an input/output device etc. for the transfer of data with a printer, PC, or other outside device is provided.

The memories store the three-dimensional shape data (including dimensional data, same below) of the robot covered by the display or simulation explained later, the three-dimensional shape data in the state where the robot mounts the image capturing means, the three-dimensional shape data of the workpiece, and also, in accordance with need, the three-dimensional shape data of the peripheral objects (for example, jigs of the workpiece, machine tools, etc.).

Further, the memories store programs, settings, etc. for operating the graphic control circuit 15 to display objects defined by these three-dimensional models in a three-dimensional space (hereinafter referred to as the "simulation space") for the simulation. Here, the positions of provision and the orientations of the objects in the simulation space (three-dimensional models) are defined by work cell data. A "work cell" is a unit of arrangement in a robot system covered by the simulation and designates the objects (three-dimensional models of robot, workpiece, peripheral equipment, etc.) included in the robot system to be covered by the simulation. The work cell data includes data designating the initial positions and orientations of the objects designated. The content of the definitions of the work cell can be changed at any time by operating the keyboard/mouse 16 for example.

The above configurations and functions explained up to here relating to this embodiment are generally well known. The simulation apparatus according to the present embodiment is equipped with, in addition to these components and functions, software for the study of the robot orientation by a graphic jog, i.e., graphically presented "robot jog" (explained in detail later), simulation considering the visual sensor, and the display operation relating to the same by the routine and processing explained later.

In this embodiment, first, as "Preparations 1", the visual field of the image capturing means is set, the tool coordinate system is set, the detection reference point is set, etc. FIG. 2 is a flow chart describing the flow of the "Preparations 1". The principal points of the steps are as follows. Note that in the following explanation, unless otherwise indicated, the terms "robot", "workpiece", "image capturing device", etc. indicate the three-dimensional models of these objects.

Step S1: The work cell is defined on the simulation apparatus 10. For example, a template of a work cell where the robot mounting the image capturing means, the workpiece, etc. are provisionally arranged is prepared in advance at an external CAD system (not shown). This is fetched into the simulation apparatus 10 once through the communication interface 17. Further, the necessary corrections, additions to, deletions from, and other changes are made to the template to determine the work cell to be covered by the simulation in the present embodiment. Of course, another method, for example, fetching existing similar work cell data from another electronic data storage medium (personal computer hard disk, flexible magnetic disk, etc.) is also possible or the data may be newly prepared on the simulation apparatus 10.

Figure 3:
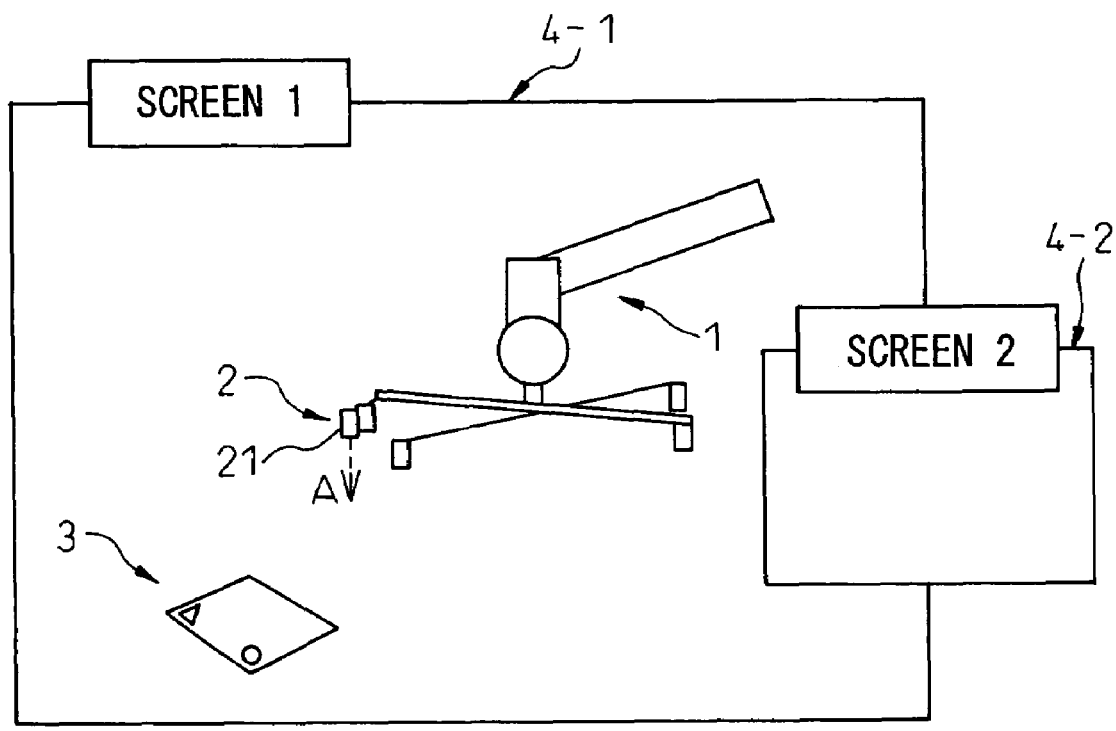
FIG. 3 is a view of the arrangement in a work cell defined by an embodiment of the present invention shown on a display screen ("Screen 1")

FIG. 3 shows the screen 4 of an arrangement (initial arrangement) in accordance with a work cell determined by one of these methods. Note that the display 18 is assumed to be one which can simultaneously arrange and display the "screen 1" 4-1 and the "screen 2" 4-2 on a single screen 4. Here, the "screen 2" 4-2 is the special screen for "display of image captured by image capturing means 2", while the general display including the display such as in FIG. 3 is given by the "screen 1" 4-1. In the display screen (screen 1) of FIG. 3, reference numerals 1, 2, and 3 indicate, in order, the robot, image capturing means of the visual sensor (mounted on the robot), and workpiece.

Further, reference numeral 21 indicates the center point of the camera defined by the image capturing means 2, while reference symbol A indicates the direction of the optical axis passing through the center point of the camera (centerline of visual field) by a broken arrow. Note that after completion of step S1 of FIG. 2, it becomes possible to display the image as seen from the image capturing means 2 on the screen 2 (4-2) at any time. Details of the display by the screen 2 will be given later.

Step S2: the three-dimensional shape (visual volume) of the visual field of the image capturing means 2 is defined. For this purpose, the data of the height h0, depth $\underline{d}$, and length $\underline{l}$ (see FIG. 4) is input from for example the keyboard 16. Here, h0 is made the optimal image capture distance of the image capturing means (actual) 2 considered to be actually used, while for $\underline{d}$ and $\underline{l}$, the data of the specifications of the model in question or the data obtained by simple arithmetic from the same is employed. That is, normally, specifications describe sufficient data required for specifying the three-dimensional shape of the visual field in some form or another, so this may be used.

Figure 4:
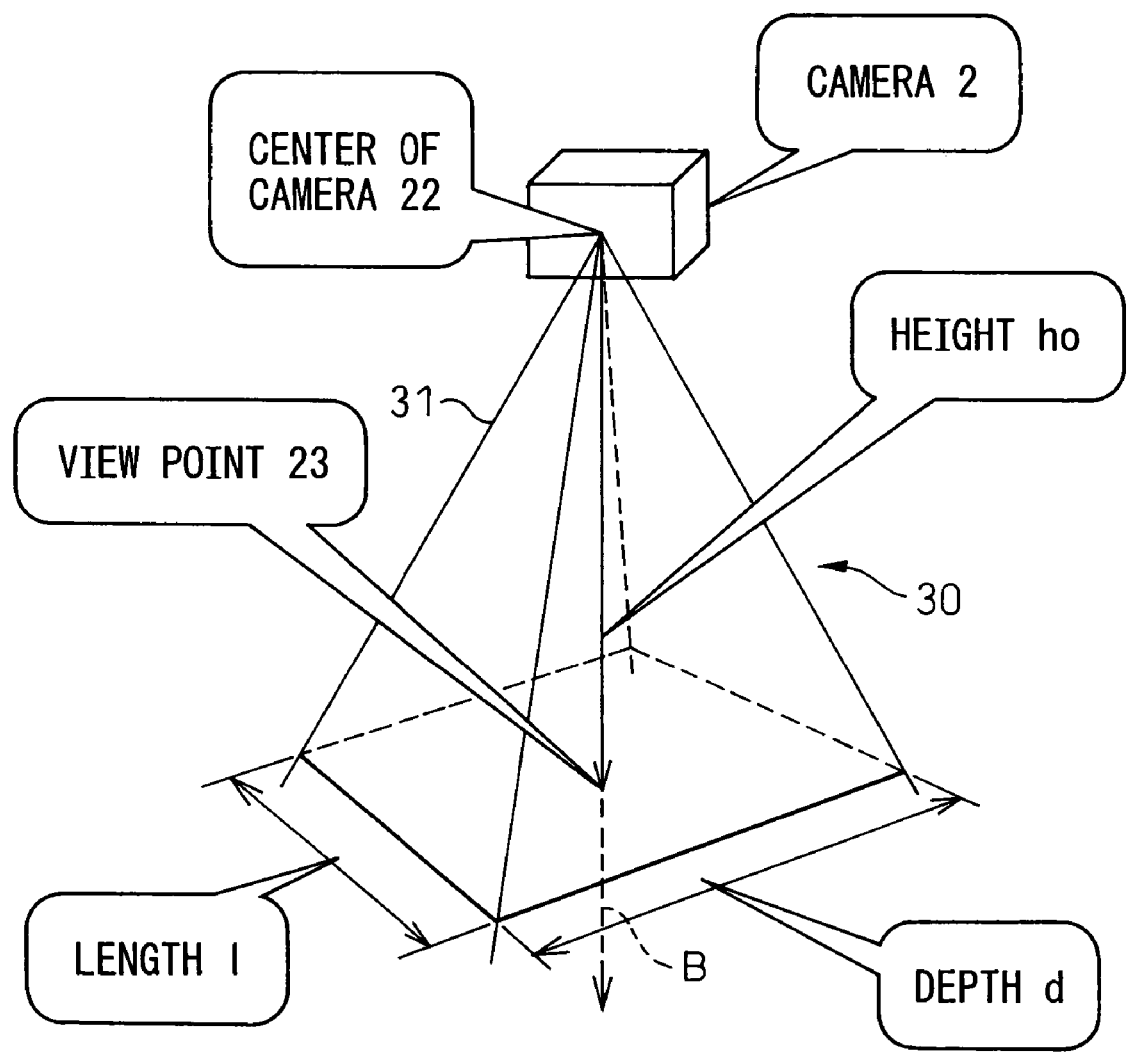
FIG. 4 is a view explaining how to set the three-dimensional shape (visual volume) of the visual field of the image capturing means.

When inputting the data of the height h0, the depth $\underline{d}$, and the length $\underline{l}$, the screen 1 (4-1) displays a visual volume model 30 showing the visual volume such as shown in FIG. 4. In FIG. 4, the camera center point 22 of the camera (image capturing means) in the visual field model is a point corresponding to the peak of the visual volume of the square pyramid (31), while the symbol B shows the direction of the visual field center line passing through the camera center point 22. The point on the visual field center line B down from the camera center point by exactly h0 is defined as the "view point" (23). The position of the view point 23 is unambiguously determined and can be simply calculated at any time if the camera center point 22 and visual field center line B are determined.

Step S3: The three-dimensional model 30 defined at step S2 is joined with (attached to) the image capturing means in the work cell (the image capturing means 2 in the screen of FIG. 3). This is done to make the camera center point 22 of the visual field model match with the camera center point (camera center point of camera model) shown by reference numeral 21 in FIG. 3 and make the visual field center line B of the visual field model match with the visual field center line A shown by reference symbol A in FIG. 3. The orientation of the visual volume around the visual field center line B is set so as to be aligned with the orientation of the image capturing means 2 in the visual field model shown in FIG. 4.

Figure 5A:
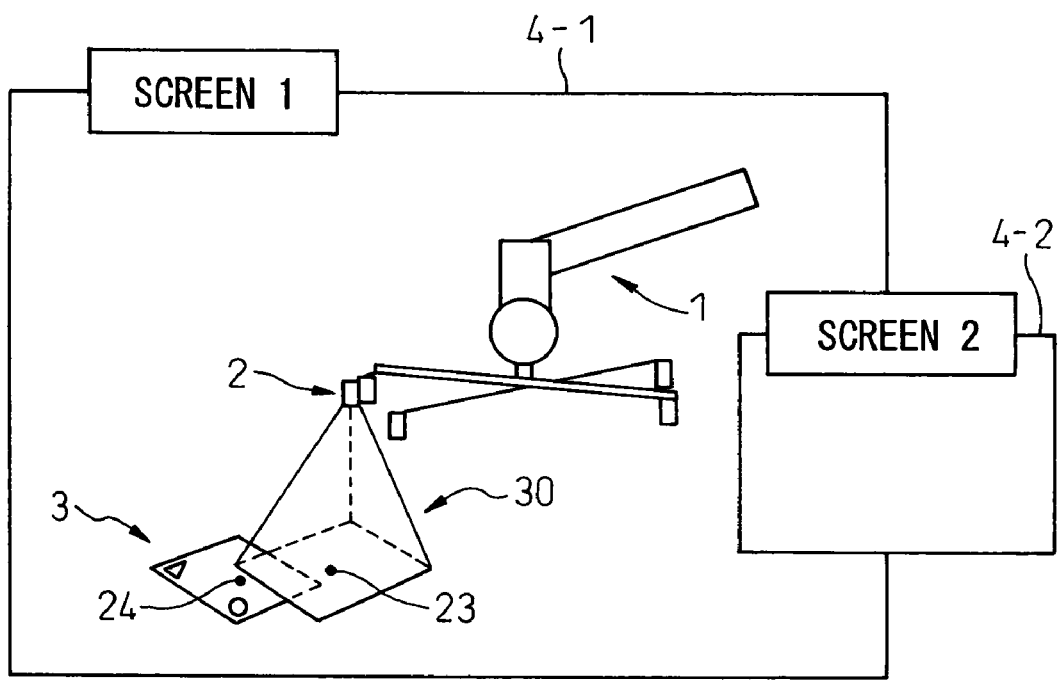

The calculations for this are performed in the simulation apparatus (10). Further, the image incorporating the joined results is displayed in the "screen 1" as shown in FIG. 5A (however, the detection reference point expressed by reference numeral 24 is displayed at the next step S4). By the display of the visual field of the image capturing means by a three-dimensional shape in this way, the range which the visual sensor can detect can be directly grasped. Further, as illustrated in the figures, the relationship between the positions and orientations of the workpiece 3 and visual field can be easily grasped.

Figure 5B:
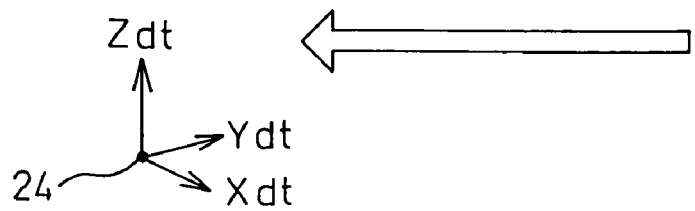
Figure 5C:
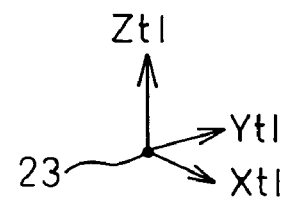

Step S4: The tool coordinate system of the robot 1 is defined. In this embodiment, as shown in FIG. 5C, the tool coordinate system is defined so that the origin of the tool coordinate system (tool tip point) matches with the abovementioned view point 23. The directions of the X-axis (Xtl) and Y-axis (Ytl) of the tool coordinate system are set to match with the direction of the depth $\underline{d}$ and the direction of the length of the visual field for example, where the direction of the Z-axis (Ztl) of the tool coordinate system is set to match with the direction of the visual field center line A. The calculations for these are performed in the simulation apparatus 10. The thus defined tool coordinate system (coordinate system having tool tip point as origin) is actively used in the later-mentioned "graphic jog".

Step S5: The detection reference point relating to the workpiece 3 is set. This detection reference point is the "point" utilized in the later-mentioned "graphic jog". Further, in general, it designates the "point" representing the workpiece 3 as the object for capture and for example the "point" corresponding to the most important image capture location in the actual work. The point is designated by defining the coordinate system such as shown in FIG. 5B (hereinafter referred to as the "detection reference coordinate system"). For this, first, for example the mouse 16 is used to point to the origin 24 of the coordinate system on the image 4 shown in FIG. 5A (however, the detection reference point 24 not yet being displayed).

The directions of the X-axis (Xdt) and the Y-axis (Ytl) of the detection reference coordinate system and the directions of the X-axis and Y-axis of the coordinate system defined in the simulation space are assumed to match. If the detection reference coordinate system is set, the origin (detection reference point) 24 is displayed in the image of FIG. 5A. Note that at the time of display of the set tool coordinate system or detection reference system, it is also possible to display the coordinate system such as shown in FIGS. 5B and 5C by graphics. Further, depending on the case, it is also possible to set two or more detection reference coordinate systems (detection reference points) for a single workpiece 3. Further, in the case of a plurality of workpieces, sometimes it is possible to set one or more detection reference coordinate systems for each workpiece.

With the above step S1 to step S5, the "Preparations 1" are completed. However, when there are a plurality of robots 1 mounting image capturing means in the defined work cell, similar preparations to the above are performed for each robot in accordance with need. At this time, data able to be used in common among the plurality of robots (for example, data of the visual volume) are suitably shared in accordance with the applications (content of work performed by robot system).

Next, in the present embodiment, after the "Preparations 1", a "graphic jog" is utilized to study the orientation of the robot relating to image capture. FIG. 6 is a flow chart setting the routine relating to the graphic jog. The principal points of each step are as follows:

Step T1: The robot 1 for performing the graphic jog is designated. As shown in FIG. 3, when there is a single robot (mounting an image capturing means) (robot 1), this is designated. When there are a plurality of robots present in the defined work cell, one among these is designated on the display screen 4 by the mouse 16 etc.

Step T2: The detection reference point made the target of movement of the graphic jog is designated. As shown in FIG. 5A, when there is a single detection reference point (detection reference point 24), this is designated. When there are a plurality of detection reference points present in a defined work cell, one among these is designated on the display screen 4 using the mouse 16 etc.

Step T3: The graphic jog processing is performed. This moves the robot 1 in the simulation space on the screen 1 (4-1). The target point is made the detection reference point defined at step S2. Here, the robot 1 is made to move so as to make the tool tip point 23 set at step S4 match with the detection reference point 24. In other words, the robot 1 is made to move so as to make the tool coordinate system (see FIG. 5C) of the robot 1 match with the detection reference coordinate system (see FIG. 5B).

The state of this robot movement is displayed in an animation form on the screen 1 (4-1). At this time, the image capturing means 2 also moves together with the robot 1 and the visual volume model 30 attached to the image capturing means 2 at step S3 also similarly moves. The screen 1 in FIG. 7 displays the display image a little before the movement of this graphic job is ended. As illustrated, the tool tip point (that is, the view point of the image capturing means 2) 23 reaches near the detection reference point 24, but does not yet match with it. In the state where the movement of the graphic jog ends, the tool tip point 23 matches with the detection reference point 24.

Note that as explained above, the tool tip point 23 and the detection reference point 24 are the origins of the tool coordinate system and detection reference coordinate system (see FIG. 5C and FIG. 5B). At the time of the end of the graphic jog, the above two coordinate systems also match in orientation. That is, Xtl axis and Xdt axis, the Ytl axis and Ydt axis, and the Ztl axis and Zdt axis all face the same directions, respectively. While the illustration is omitted in FIG. 7, the states of match of the orientations of the coordinate systems may also be displayed overlaid.

The graphic jog explained above is useful for studying the orientation of the robot 1. For example, by checking if the orientation of the robot is unreasonable or if there is a possibility of interference with surrounding objects at the time of making the tool tip point 23 set to the view point of the image capturing means 2 match with the detection reference point 24, it is possible to evaluate the suitability of the position and orientation of arrangement of the robot which the work cell sets. If there is a problem in the position or orientation of arrangement of the robot (for example if the workpiece 3 and the robot 1 are too far apart or if the direction of the robot base is unsuitable), the position and orientation of arrangement of the robot in the work cell are corrected or the position and orientation of the workpiece or the position and orientation of mounting of the image capturing means are changed so as to correct the work cell. These corrections are performed until the orientation of detection of the robot 1 to the detection reference point 24 simulated by the graphic jog becomes suitable. Therefore, if necessary, the processings of "Preparations 1" and "graphic jog" are repeated.

Here, the "display of image visible from image capturing means 2" by the screen 2 (4-2) will be explained. As explained above, after the end of step S1, it becomes possible to display the image visible from the image capturing means 2 on the screen 2. That is, at the end of step S1, the relationship between the position and orientation of the visual volume model 30 having the camera center point 21 (and 22) as the peak in the simulation space and the position and orientation of the robot 1 is set and the position and orientation of the workpiece 3 etc. are also known as data of the work cell. Therefore, if giving the data of the position and orientation of the robot 1, it is possible to find by calculation the image visible from the image capturing means 2 from the three-dimensional position data grasped in the visual field according to the visual volume model 30. This calculation can for example be image projection calculation by applying the model of a pinhole camera to the image capturing means 2. Note that the software itself for simulating this kind of image projection of an image capturing means is known. A detailed explanation will be omitted.

The display of the screen 2 (4-2) may be performed at any time, but here if assuming display at the time of execution of the graphic jog, for example the display image such as shown in the screen 2 in FIG. 7 is obtained (in FIG. 3 and FIG. 5A, the screen 2 is not shown). In the screen 2 of FIG. 7, the state where the tool tip point (that is, the view point of the image capturing means 2) 23 is near the detection reference point 24 corresponding to the screen displayed on the screen 1 (4-1) is displayed. In the state where the movement of the graphic jog is ended, naturally the state where the tool tip point 23 matches with the detection reference point 24 is displayed.

Figure 8:
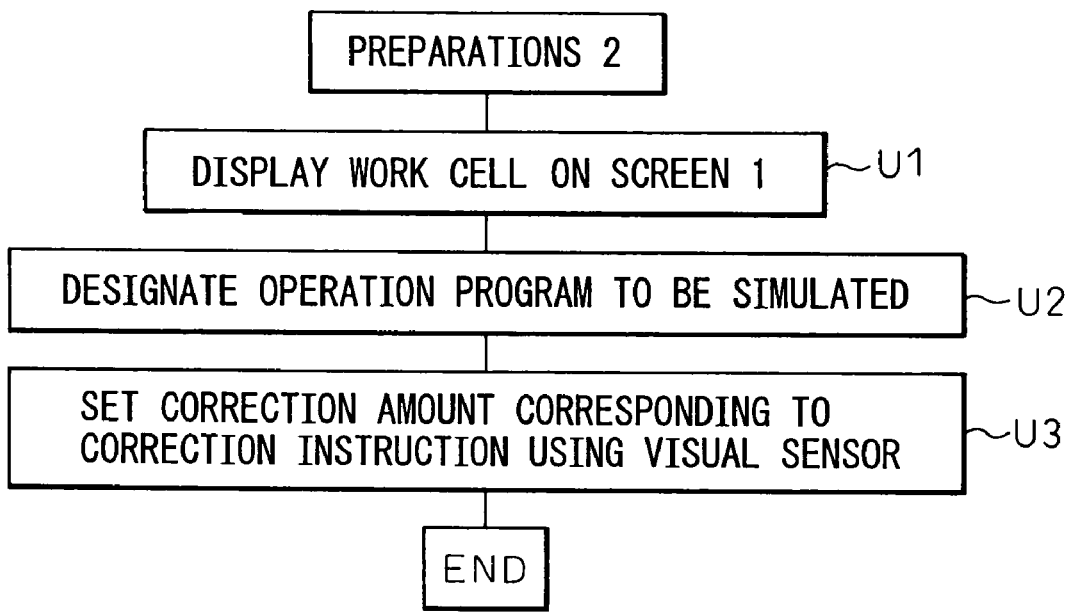
FIG. 8 is a flow chart describing the flow of "Preparations 2" performed in an embodiment of the present invention.

Next, the simulation in accordance with the robot operation program including robot movement commands and commands for correcting the path of movement utilizing a visual sensor in relation to the robot movement commands will be explained. In this embodiment, the "Preparations 2" are performed in accordance with the routine shown in the flow chart of FIG. 8 in the state where the "Preparations 1", the correction of the work cell by the graphic jog, or the confirmation of the suitability of the work cell if correction is unnecessary are completed. The principal points of these steps are as follows:

Step U1: The arrangement of the work cell provided through the above process is displayed on the screen 1. Here, the image displayed on the screen 1 is for example one as shown in FIG. 5A. This display includes the images of the robot 1, image capturing means 2, workpiece 3, and visual volume model 30. If using the above graphic jog to correct the work cell, the arrangement after that correction is displayed.

Step U2: The program for the operation simulation is designated. As an example of designation, the list of programs is shown divided in the screen 1 (4-1) and one among them is designated by the mouse 16. Here, since the simulation is performed considering the visual sensor, the one robot operation program including the robot movement commands and the commands for correcting the path of movement using the visual sensor relating to the robot movement commands (hereinafter referred to as the "correction commands using the visual sensor") is designated.

Figure 9:
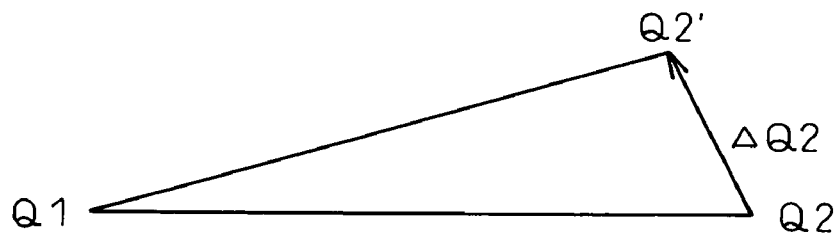
FIG. 9 is a view explaining setting of a correction amount.

Step U3: The correction amount for the path of movement of the robot corresponding to the correction command using the visual sensor is set (hereinafter simply referred to as the "setting of correction amount"). Here, as one example, as shown in FIG. 9, the correction amount $\Delta Q2$ ($\Delta X2$, $\Delta Y2$, $\Delta Z2$; $\Delta P2$, $\Delta W2$, $\Delta R2$) for changing the position of the teaching point Q2 to Q2' (X2+$\Delta X2$, Y2+$\Delta Y2$, Z2+$\Delta Z2$; P2+$\Delta P2$, W2+$\Delta W2$, R2+$\Delta R2$) is set for the linear movement from the teaching point Q1 (X1, Y1, Z1; P1, W1, R1) to the teaching point Q2 (X2, Y2, Z2; P2, W2, R2). The movement from Q1 to Q2 (after correction Q1 to Q2') is used in the yes side output of step V6 to step 10 in the flow chart of the simulation explained next (see FIG. 10B).

When the "Preparations 2" have been completed in this way, the "operation program simulation" is performed by the routine described in the flow charts of FIG. 10A and FIG. 10B. The principal points of the steps are as follows. Note that here, during this simulation, the screen 2 (4-2) of the display is held off.

Figure 11:
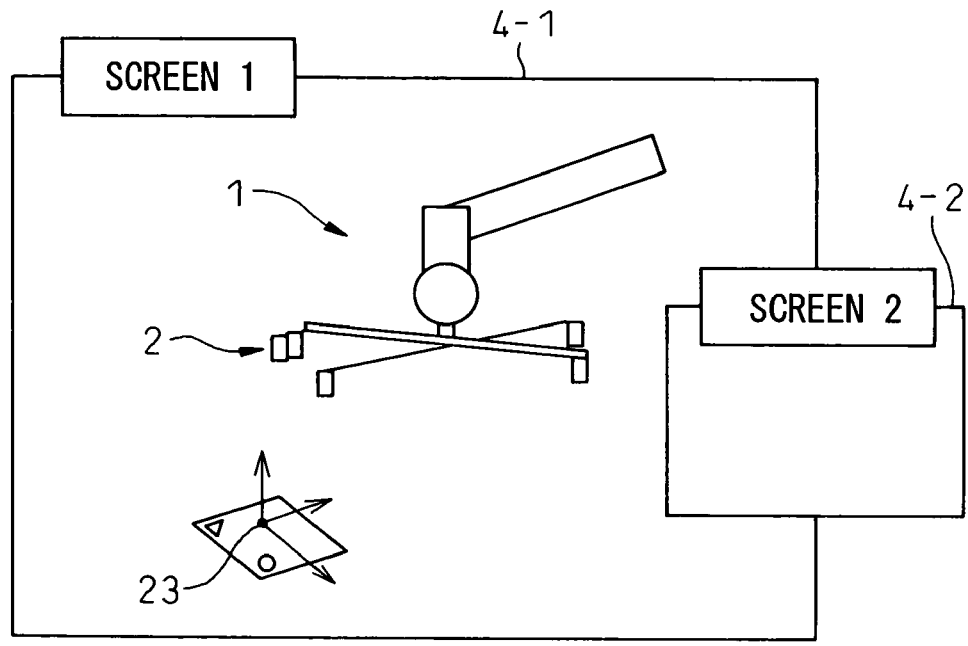
FIG. 11 is a view showing a displayed image of a display at the time when an image capturing command is not issued in the process of simulation of an operation program.

Step V1: The screen 1 (4-1) is made to display an image with the visual volume model 30 off as illustrated in FIG. 11.

Step V2: The number N of lines of the operation program designated is read.

Step V3: The operation program is started up.

Step V4: The line number index I is initialized to "1".

Step V5: The first line of the operation program is read.

Step V6: It is judged if the read line is a correction command using the visual sensor (further provided with an image capturing command including a detection command for the visual sensor for correcting the path of movement of the robot). If the result is yes, the routine proceeds to step V7. If no, it proceeds to step V10.

Figure 12:
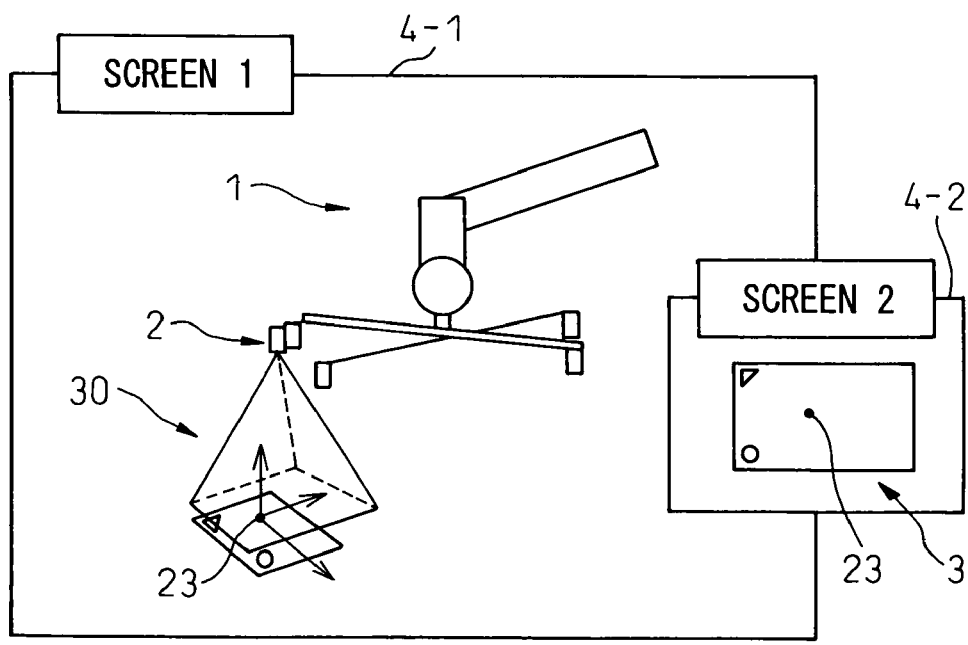
FIG. 12 is a view showing a displayed image of a display at the time when an image capturing command is issued in the process of simulation of an operation program.

Step V7: The display of the screen 1 is switched to the image displaying the visual volume model 30 such as shown in FIG. 12. Due to this, an operator can obtain a visual grasp of the fact that a correction command using the visual sensor has been output.

Step V8: The set correction amount is read and the position of movement of the robot 1 is corrected. Here, it is assumed that the position of movement initially designated is the above-mentioned teaching point Q2 and that position is changed to Q2'. That is, the correction amount $\Delta Q2$ ($\Delta X2$, $\Delta Y2$, $\Delta Z2$; $\Delta P2$, $\Delta W2$, $\Delta R2$) is read out and Q2 (X2, Y2, Z2; P2, W2, R2) is changed to Q2' (X2+$\Delta X2$, Y2+$\Delta Y2$, Z2+$\Delta Z2$; P2+$\Delta P2$, W2+$\Delta W2$, R2+$\Delta R2$). Note that here, the position and orientation of display of the workpiece 3 in the screen 1 (4-1) can be changed by exactly the corresponding correction amount $\Delta Q2$ as shown in FIG. 13. Further, if there is a work-piece jig or other separate surrounding object, the position and orientation of the display can be changed together.

Step V9: The visual volume model 30 in the screen 1 (4-1) is returned to the nondisplayed state.

Step V10: The robot 1 is made to move in the simulation space. Here, the robot 1 is moved from Q1 (X1, Y1, Z1; P1, W1, R1) to Q2' (X2+$\Delta X2$, Y2+$\Delta Y2$, Z2+$\Delta Z2$; P2+$\Delta P2$, W2+$\Delta W2$, R2+$\Delta R2$). This state is displayed on the screen 1 in the form of an animation. However, when proceeding from step V6 directly to step V10 (when there is no correction command using the visual sensor), the command of that line is executed in the usual manner.

Step V11: Whether the line is the final line is judged. If the result is yes, the processing is ended. If no, the routine proceeds to step V12.

Step V12: The line index I is incremented by "1" and the routine returns to step V5.

While the invention has been described with reference to specific embodiments chosen for purpose of illustration, it should be apparent that numerous modifications could be made thereto by those skilled in the art without departing from the basic concept and scope of the invention.

What is claimed is:

1. A simulation apparatus comprising:
   the simulation apparatus arranging and simultaneously displaying on a screen three-dimensional models of at least a robot, a workpiece, and an image capturing function unit of a visual sensor, and simulating operation of the robot; and
   a visual field display function unit displaying a three-dimensional shape on the screen that illustrates a visual field of the image capturing function unit, the three-dimensional shape being defined by a user of the simulation apparatus, further provided with an image display function unit displaying an image captured by the image capturing function unit in the visual field on a screen 2. A simulation apparatus as set forth in claim 1, wherein the three-dimensional shape of the visual field is a square pyramid.

3. A simulation apparatus as set forth in claim 1, wherein the image capturing function unit is mounted on the robot.

4. A simulation apparatus as set forth in claim 3, further provided with:
   a reference point designating function unit designating a first reference point relating to the workpiece on the screen and
   a robot operating function unit making the robot on the screen operate so that a predetermined second reference point relating to the visual field matches with the first reference point.

5. A simulation apparatus as set forth in claim 1, further provided with:
   a simulating function unit performing a simulation including robot movement in accordance with a robot operation program including image capturing commands for making the image capturing function unit capture an image, movement commands for making the robot move along a path, and correction commands relating to the image capturing commands and movement commands,
   memory function units storing correction amounts relating to the path of movement designated by the movement commands, and a path correcting function unit reading out the stored correction amounts and correcting the path of movement on the screen by the correction commands during the simulation.

6. A simulation apparatus as set forth in claim 5, further provided with a display switching function unit switching the display mode of the display of the visual field in accordance with the image capturing command.

7. A simulation apparatus as set forth in claim 5, wherein the image capturing function unit is mounted on the robot.

8. A simulation apparatus as set forth in claim 5, further provided with:
- a reference point designating function unit designating a first reference point relating to the workpiece on the screen and
- a robot operating function unit making the robot on the screen operate so that a predetermined second reference point relating to the visual field matches with the first reference point.

9. A simulation apparatus as set forth in claim 5, wherein the switching of the display mode is switching of display/nondisplay in accordance with the image capturing command.

10. A simulation apparatus as set forth in claim 5, including correcting the position of arrangement of at least one of the workpiece and peripheral equipment on the screen in accordance with the correction amounts.

* * * * *